United States Patent [19]

Kawamura et al.

[11] Patent Number: 4,471,653

[45] Date of Patent: Sep. 18, 1984

[54] CRANK ANGLE DETECTING DEVICE FOR AN INTERNAL COMBUSTION ENGINE AND DETECTING METHOD THEREFOR

[75] Inventors: Yoshihisa Kawamura; Toyoaki Nakagawa, both of Yokosuka, Japan

[73] Assignee: Nissan Motor Company, Limited, Kanagawa, Japan

[21] Appl. No.: 461,124

[22] Filed: Jan. 26, 1983

[30] Foreign Application Priority Data

Feb. 3, 1982 [JP] Japan .................................. 57-14754

[51] Int. Cl.³ .............................................. G01M 15/00

[52] U.S. Cl. ........................................ 73/116; 123/612

[58] Field of Search ............. 73/116, 119 A; 123/406, 123/414, 416, 417, 472, 478, 480, 612

[56] References Cited

U.S. PATENT DOCUMENTS 4,348,893 9/1982 Hendrix et al. ........................ 73/116

4,380,982 4/1983 Kobashi .......................... 123/414 X

*Primary Examiner*—Jerry W. Myracle

*Attorney, Agent, or Firm*—Lowe, King, Price & Becker

[57] ABSTRACT

A device for determining a crank shaft angular position performs operation for determining the crank shaft angular position at an occurrence of timing control in an internal combustion engine control, such as fuel injection timing control, spark ignition timing control and so forth. In determination of the crank shaft angular position, an angular acceleration is firstly calculated with respect to respective intervals of crank reference angle signals. In calculation, the determined angular acceleration is regarded as constant instead of an angular velocity. At the same time, time intervals between respectively adjacent crank reference signals and between one of crank reference signal and a timing control signal immediately following to the one of crank reference angle signal are measured. Based on the determined angular acceleration and the time interval between the one of crank reference angle signal and the timing control signal, the crank shaft angular position at the occurrence of the timing control signal is determined. This may provide determination of the crank shaft angular position precisely following to the actual crank shaft angular position even when the engine revolutional fluctuation is significant.

9 Claims, 8 Drawing Figures

CRANK ANGLE DETECTING DEVICE FOR AN INTERNAL COMBUSTION ENGINE AND DETECTING METHOD THEREFOR

BACKGROUND OF THE INVENTION

The present invention relates generally to a crank angle detecting device for an internal combustion engine. More particularly the invention relates to the crank angle detecting means adapted to process crank shaft angular position data for precisely detecting a timing, such as fuel injection timing and/or spark ignition timing, with respect to a crank shaft reference angle.

In an electronic engine control, it is essential to detect the timing parameters in relation to a crank shaft angular position. In order to detect the crank shaft angular position, the crankshaft is equipped with a crank angle sensor for producing a pair of crank angle signals. In general, the crank angle sensor is adapted to produce a crank reference signal at predetermined crank shaft angular positions, e.g. at every 90° or 120° depending on the number of cylinders in the engine. The crank angle sensor is further adapted to produce a crank position signals at predetermined crank shaft rotational angles, e.g. 0.5° or 1°.

In view of the manufacturing cost, a crank angle sensor producing only the crank reference signals is preferred when such crank angle sensor is used. In this case, the intervals between the crank reference signal are measured by means of a clock. The average rotational speed of the crankshaft is calculated on the basis of the measured interval and the predetermined crank shaft rotational angle to produce the crank reference signal. The crank shaft angular position at a certain timing, such as fuel injection timing and/or spark ignition timing, can then ba approximated, from the calculated average rotational speed and the measured period.

However, if the engine is in a state wherein cycle-to-cycle fluctuation of engine speed is significant, such as during cranking or the engine warm-up period, errors between the actual crank angle position and approximated value become unacceptably great. In particular, if the engine is a diesel engine which tends to fluctuate significantly even during one cycle of engine revolution, the error between the actual crank angle position and the approximated value will be significant. This leads to errors in timing control, such as fuel injection timing control and/or spark ignition timing control, which in turn may cause increase of exhaust emissions or engine noise, poor fuel economy or degradation of drivability.

On the other hand, reduction of emissions and engine noise and improvement of fuel economy are all quite necessary nowadays. This requires more precise control of engine processes. To control engine operation more precisely, the crank shaft angular positions as crucial timings, such as fuel injection timing, spark ignition timing and so forth, must be determined accurately.

SUMMARY OF THE INVENTION

Therefore, it is an object of the present invention to provide a timing calculation device and method with respect to crank shaft angular position, which can precisely determine the crank shaft angular position at a given timing even during engine conditions in which fluctuation of the engine revolution speed within an engine cycle is sufficiently large to influence for the result of calculation otherwise.

To accomplish the above-mentioned and other objects, there is provided a crank angle timing calculation device which measures the time interval between crank reference angle signals and the time interval between the occurrence of a timing signal and the occurrence of the immediately preceding crank reference angle signal. On the basis of the measured period, the angular acceleration during the measured period is approximated. On the basis of the angular acceleration and the measured period, the crank shaft angular position at the occurrence of the timing signal is determined.

In order to perform the foregoing calculation, the device according to the present invention, includes counters, one of which is used to measure the interval between occurrences of the crank reference angle signals, another of which measure the interval between the occurrence of the timing signal and the occurrence of the immediate preceding crank reference angle signal, and another which counts the crank reference angle signals. An arithmetic circuit calculates the angular acceleration on the basis of the counter values and calculates the crank shaft angular position at the occurrence of the timing signal on the basis of the determined angular acceleration.

According to the preferred embodiment of the present invention, there is provided a crank angle detecting device for an internal combustion engine comprising a timing signal generator associated with an engine control system to receive therefrom a timing control signal and responsive to the timing control signal to output a timing signal, a reference signal generator associated with a crank angle sensor for receiving a crank reference angle signal and responsive to the crank reference angle signal to output a reference signal, first means for measuring the time intervals between the occurrences of the reference signals and the intervals between the occurrences of the timing signal and the immediate preceding reference signals, second means for calculating the angular acceleration during each measured interval of reference signals on the basis of said measured period of time, and third means for determining the crank shaft angular position at the occurrence of the timing signal on the basis of the angular acceleration and the measured time interval between the occurrence of the timing signal and the occurrence of the immediate preceding reference signal.

BRIEF DESCRIPTION OF THE DRAWINGS

The invention will be understood more fully from the detailed description given herebelow and from the accompanying drawings of the preferred embodiments of the present invention, which, however, should not be taken as limitative to the invention but for elucidation and explanation only.

In the drawings.

DESCRIPTION OF THE PREFERRED EMBODIMENTS

Figure 1:
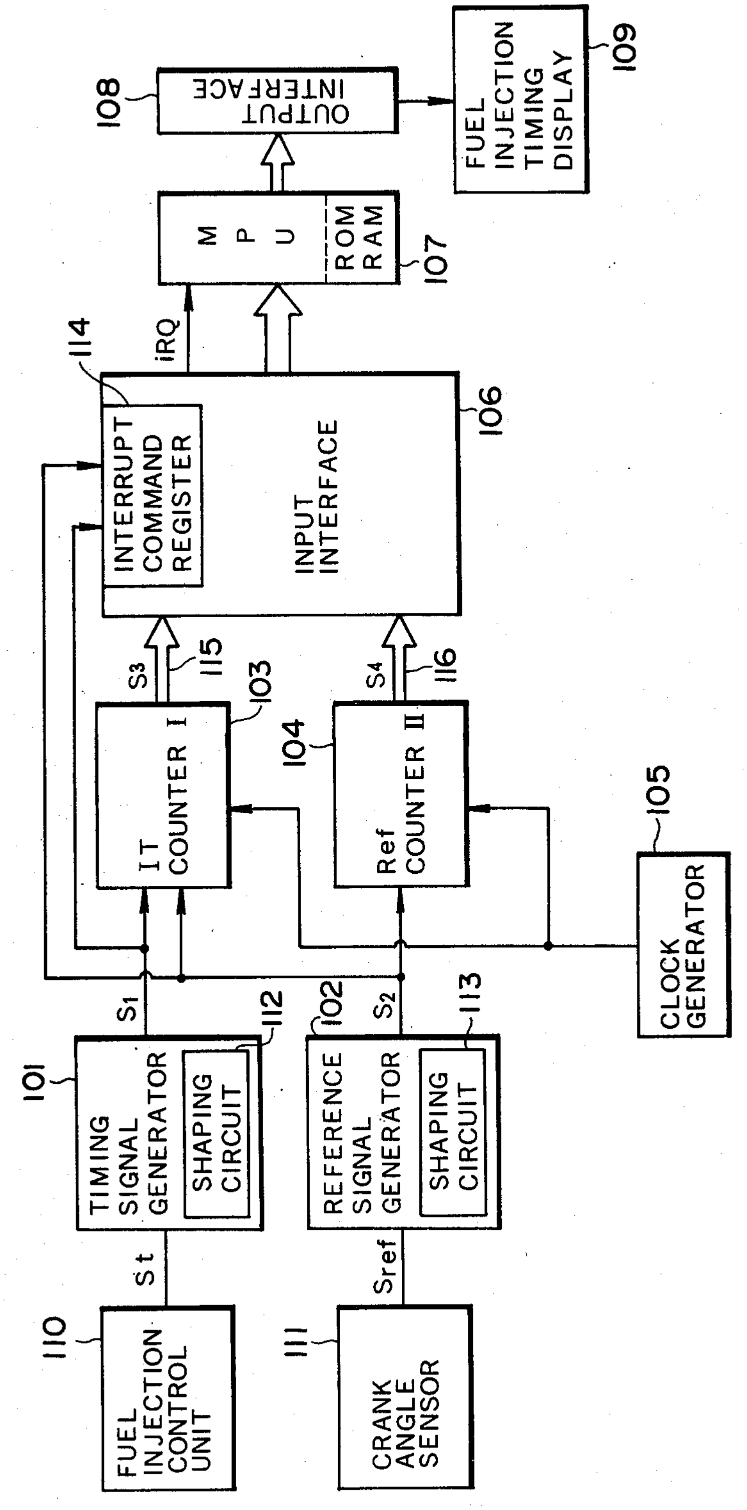
FIG. 1 is a schematic block diagram of the first embodiment of the crank angle detecting device according to the present invention.

Referring now to the drawings, particularly to FIG. 1, there is illustrated the preferred embodiment of a crank angle detecting device according to the present invention. In the shown embodiment, the crank angle detecting device is adapted to determine fuel injection timing in an electronically controlled fuel injection internal combustion engine.

A timing signal generator 101 is associated with a fuel injection control unit 110 to receive therefrom a fuel injection timing signal St. The timing signal generator 101 is responsive to the fuel injection timing signal St to produce a timing signal $S_1$ which is outputted via a shaping circuit 112 incorporated as part of the timing signal generator. On the other hand, a crank angle sensor 111 is connected to a reference signal generator 102. The reference signal generator 102 includes a shaping circuit 113 and is adapted to output a reference signal $S_2$ via the shaping circuit in response to a crank reference signal $S_{ref}$ produced at predetermined crank shaft angular positions.

The timing signal generator 101 is connected to a timing signal counter 103 to feed thereto the timing signal $S_1$. The counter I 103 is also connected to a clock generator 105 to receive therefrom a clock signal $S_c$. The counter I 103 is adapted to measure the period of the timing signal $S_1$ in units of the clock signal pulses $S_c$. Likewise, the reference signal generator 102 is connected to a counter II 104 which is, in turn, connected to the clock generator 105 to receive therefrom the clock signal $S_c$. The counter II 104 is adapted to measure the period of the reference signal $S_2$ in units of the clock signal pulses. Both of the counter I 103 and the counter II 104 are adapted to produce counter signals $S_3$ and $S_4$ respectively indicative of the counter values representative of the measured periods of the timing signal and the reference signal. Respective counter signals $S_3$ and $S_4$ are fed to an input interface 106 of a microcomputer via corresponding buses 115 and 116.

The crank angle signals $S_1$ and $S_2$ are also fed to an interrupt command register 114 incorporated in the input interface 106. The interrupt command register 114 is adapted to produce an interrupt command $i_{RQ}$ every time one of the crank angle signals $S_1$ or $S_2$ is inputted thereto. The interrupt command $i_{RQ}$ is transferred to a microprocessing unit 107 in the microcomputer to perform a timing calculation as an interrupt routine. The microprocessing unit 107 is connected to a fuel injection timing display 109 via an output interface 108.

As will be appreciated, the microprocessing unit 106 includes a CPU, ROM and RAM, in which the ROM and RAM serve as a memory to store program operations and calculation data respectively.

Here, the timing calculation will be described in general for a better understanding of the present invention.

Figure 2:
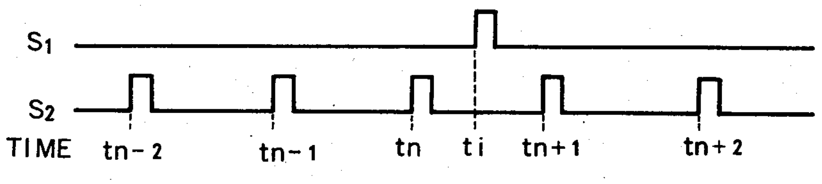
FIG. 2 is a timing chart showing the relationship between the fuel injection timing signal and the crank reference angle signal.
Figure 3:
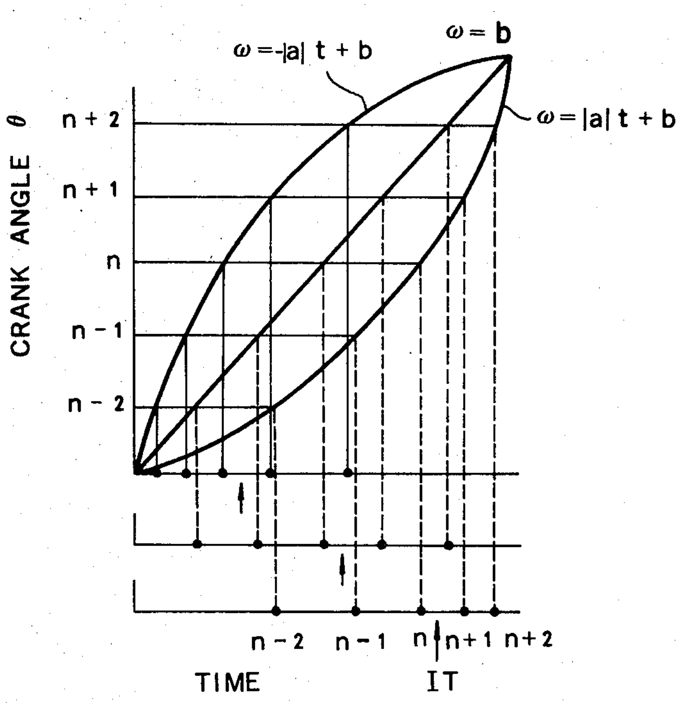
FIG. 3 is an explanatory graph showing how the crank shaft angular position might vary with respect to time.
Figure 4:
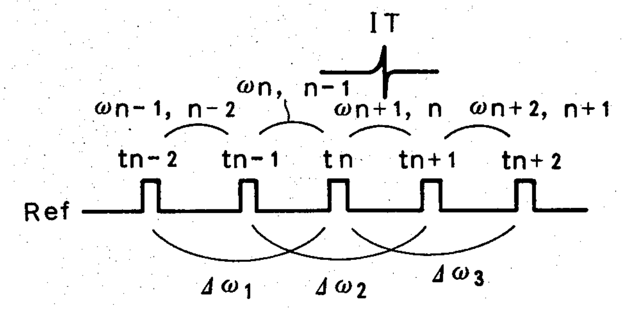
FIG. 4 is an explanatory timing chart in which the angular velocity during each interval is considered to be different from that during other intervals.

Assuming that the crank reference signal $S_{ref}$ is produced (r) times in one cycle of the crank shaft rotation, the angular interval ($\theta_r$) of each predetermined crank shaft angle is $\theta_r = 360°/r$. Further, it is assumed throughout the documents that the crank reference signal pulses occur at times . . . $t_{n-2}$, $t_{n-1}$, $t_n$, $t_{n+1}$, $t_{n+2}$ . . . and the fuel injection pulse occurs at a time $t_i$ and the time $t_i$ is intermediate between times $t_n$ and $t_{n+1}$, as shown in FIG. 2. It can then be considered that the crank shaft angular position is a function of time, as shown in FIG. 3.

From the above, the timing ($\theta_i$) of the fuel injection can be calculated from the following equation.

$$\theta_i = \int_{t_n}^{t_i} \omega dt$$

where $\omega$ is angular velocity which can be calculated from $\omega(°/\text{sec}) = d\theta/dt$. Assuming the engine speed is N(rpm), then $$\omega \left( = \frac{N \times 360^{(°)}}{60^{(sec)}} \right)$$

—equal to 6N(°/sec).

(i) When the angular velocity ($\omega$) is constant:

$$\omega = \frac{\theta_r}{t_n - t_{n-1}} \qquad (1)$$

$$\theta_i = \frac{\theta_r}{t_n - t_{n-1}} \times (t_i - t_n)$$

As apparent from the foregoing, by detecting the time intervals from $t_i$ to $t_n$ and from $t_n$ to $t_{n-1}$, the fuel injection timing, i.e., the crank shaft angular position $\theta_i$, can be derived from the foregoing formula (1). Assuming the angular velocity $\omega$ is constant, the time intervals between the occurrences of the crank reference signals are constant.

(ii) When the angular velocity $\omega$ is ($a_t + b$) wherein a and b are positive or negative constants and angular acceleration is constant.

$$\theta = \int_{t_n}^{t_i} \omega dt = \frac{a}{2}(t_i - t_n)^2 + b(t_i - t_n)$$

Here, substituting the ratio of the rate of change of the angular velocity ($\Delta\omega$) obtained by approximation and the rate of change of the time period ($\Delta t$) for the angular acceleration (a), the angular acceleration a can be represented as $a = d\omega/dt = \Delta\omega/\Delta t$.

The rate of change of angular velocity $\Delta\omega$ can be approximated by the difference between average angular velocities such as obtained from the following equations:

$$\Delta\omega_1 = \omega_{n,n-1} - \omega_{n-1,n-2}$$

$$\Delta\omega_2 = \omega_{n+1,\omega_n} - \omega_{n,n-1}$$

-continued $$\Delta\omega = \omega_{n+2,n+1} - \omega_{n+1,n}$$

where $\omega_{n,n-1}$, for example, is the average angular velocity during the period from $t_{n-1}$ to $t_n$. Correspondingly, the time variation $\Delta t$ can be obtained from the following equations:

$$\Delta t_1 = t_n - t_{n-1}$$

$$\Delta t_2 = t_{n+1} - t_n$$

$$\Delta t_3 = t_{n+2} - t_{n+1}$$

Therefore, the angular acceleration a can be obtained from the equations:

$$a_1 = \frac{\Delta\omega_1}{\Delta t_1} = \frac{\omega_{n,n-1} - \omega_{n-1,n-2}}{t_n - t_{n-1}}$$

$$a_2 = \frac{\Delta\omega_2}{\Delta t_2} = \frac{\omega_{n+1,n} - \omega_{n,n-1}}{t_{n+1} - t_n}$$

$$a_3 = \frac{\Delta\omega_3}{\Delta t_3} = \frac{\omega_{n+2,n+1} - \omega_{n+1,n}}{t_{n+2} - t_{n-1}}$$

On the other hand, the value b can be derived from the foregoing equation (1), if the angular acceleration a is zero. The value b can be expressed, corresponding to angular acceleration $a_1$, $a_2$ and $a_3$, by the following equations:

$$b_1 = \frac{\theta_r}{t_n - t_{n-1}} = \omega_{n,n-1}$$

$$b_2 = \frac{\theta_r}{t_{n+1} - t_n} = \omega_{n+1,n}$$

$$b_3 = \frac{\theta_r}{t_{n+2} - t_{n+1}} = \omega_{n+2,n+1}$$

In the prior art, the fuel injection timing $\theta_i$ is determined according to the foregoing equation (1) under the assumption that the angular velocity $\omega$ is constant. According to the present invention, the fuel injection timing $\theta_i$ is determined under the assumption that the angular acceleration a is constant.

According to the present invention, the calculation of the fuel injection timing $\theta_i$ according to the foregoing item (ii) is further modified in order to more precisely calculate the timing. Specifically, the formula used to obtain the fuel injection timing varies in accordance with the value $(t_i - t_n)$, as described below.

(A) When the fuel injection is effected in a period $t_n$ to $t_{n'}$ $(=t_n+\Delta t_1)$, the fuel injection timing is obtained from:

$$\theta_i = \frac{(\omega_{n,n-1} - \omega_{n-1,n-2})}{2(t_n - t_{n-1})} \times (t_i - t_n)^2 + \omega_{n,n-1} \times (t_i - t_n) \quad (2)$$

(B) When the fuel injection timing is in a period $t_{n''}$ $(=t_n+\Delta t_2)$ to $t_{n+1}$, the following formula is used:

$$\theta_i = \frac{(\omega_{n+2,n+1} - \omega_{n+1,n})}{2(t_{n+2} - t_{n+1})} \times (t_i - t_n)^2 + \omega_{n+2,n+1} \times (t_i - t_n) \quad (3)$$

Figure 5:
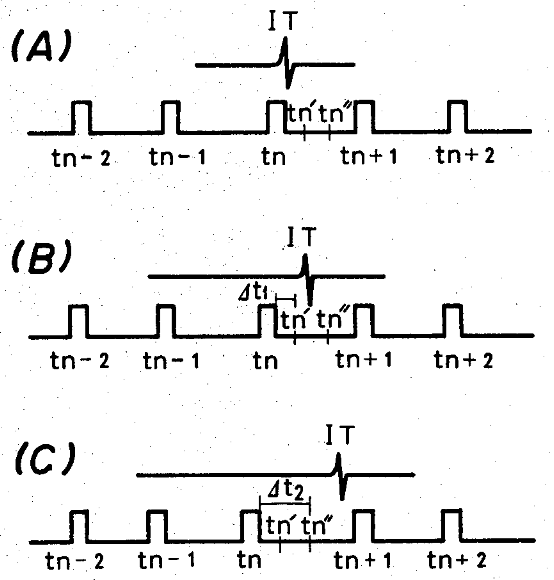
FIGS. 5(A) to 5(C) are explanatory timing charts showing fuel injection timings in relation to crank reference angle signals.

(C) When the fuel injection timing $\theta_i$ is in a period $t_{n'}$ $(=t_n+\Delta t_1)$ to $t_{n''}$ $(=t_n+\Delta t_2)$, as shown in FIG. 5, the following formula is used:

$$\theta_i = \frac{(\omega_{n+1,n} - \omega_{n,n-1})}{2(t_{n+1} - t_n)} \times (t_i - t_n)^2 + \omega_{n+1,n} \times (t_i - t_n) \quad (4)$$

As will be appreciated, the calculation timing for obtaining the fuel injection timing is also differed depending on which formulae of (2) to (4) is used. Namely, if the formula (2) is used, the calculation timing is $t_n$; if the formula (3) is used the calculation timing is $t_{n+2}$; and, if the formula (4) is used, the calculation timing is $t_{n+1}$.

It should be noted that, however, it is possible to approximately obtain the fuel injection timing using only two different formulae or even a single formula. In former case, the formulae (2) and (3) may be used and in latter case, the formula (4) may be used.

Figure 6:
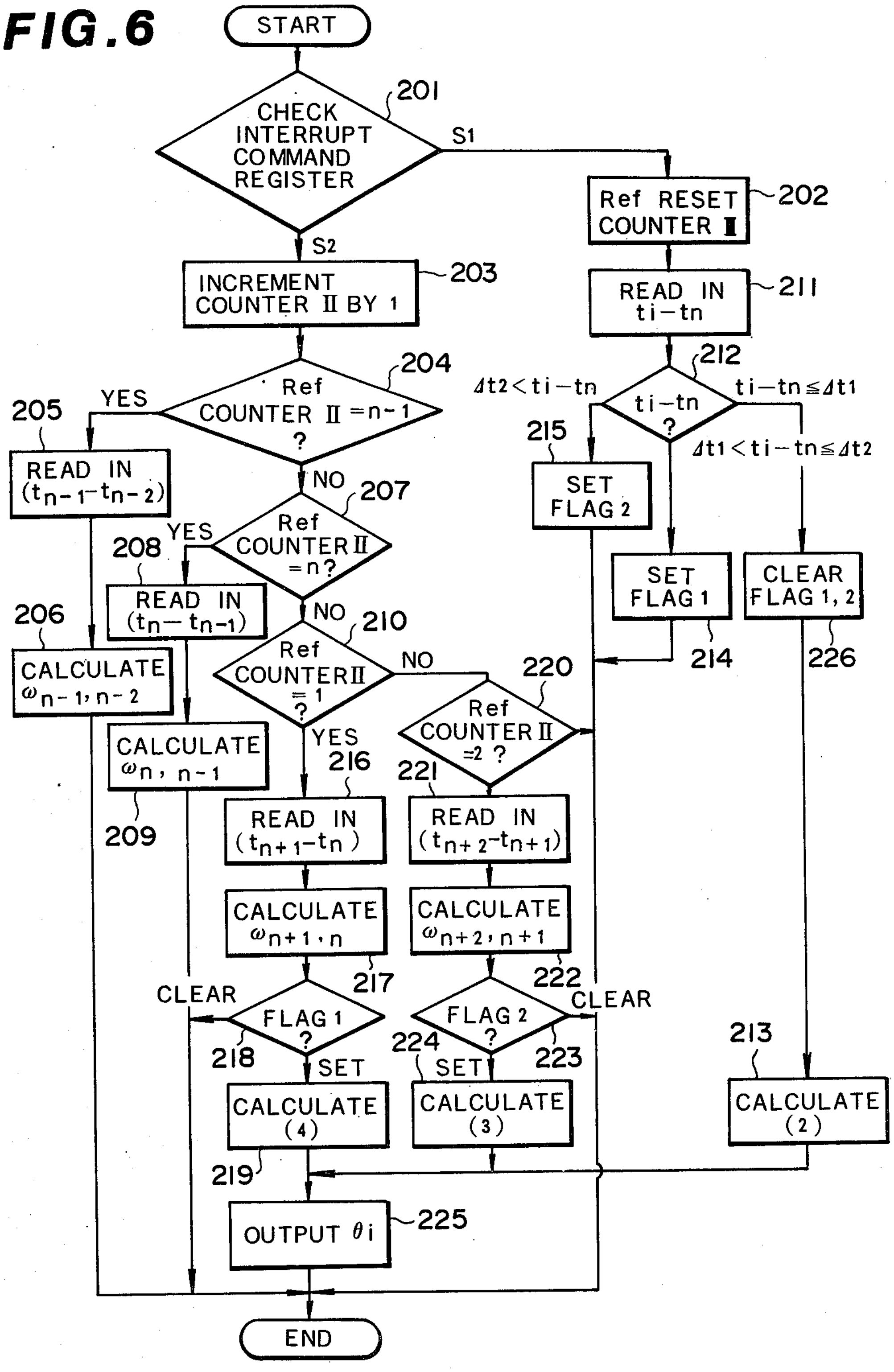
FIG. 6 is a flowchart of the crank angle calculation in the crank angle detecting device of FIG. 1.

FIG. 6 shows a flowchart of the fuel injection timing calculation program according to the shown embodiment of the present invention. As set forth previously, the fuel injection timing calculation program is executed as an interrupt routine whenever the interrupt command $i_{RQ}$ is produced by the interruption command register 114 in response to one of the timing signal $S_1$ and the reference $S_2$.

Immediately after starting the program execution, at a block 201, the interruption command register 114 is checked to see which interruption factor, the timing signal $S_1$ or the reference signal $S_2$, has triggered the interrupt request. If the program is executed in response to the timing signal $S_1$, the counter II 104 is reset to clear the counter value at a block 202. Alternatively, if the program is executed in response to the reference signal $S_2$, as determined at the block 201, the counter value of the counter II 104 is incremented by 1 at a block 203. Then, the counter value of the counter II 104 is compared with $(n-1)$ to see whether or not the two values are equal, at a block 204. If YES, the interval between $t_{n-2}$ and $t_{n-1}$ is read out from the counter II 104, at a block 205. Based on the read-out value $(t_{n-2}-t_{n-1})$, the angular velocity $\omega_{n-1,n-2}$ is calculated according to the equation.

$$\omega_{n-1,n-2} = \theta/(t_{n-1} - t_{n-2})$$

at a block 206. After the block 206, the program execution.

On the other hand, if the counter value is not equal $n-1$ as checked at the block 204, then, the counter value of the counter II 104 is again checked to see if it is equal to n, at a block 207. If YES, the interval between the times $t_n$ and $t_{n-1}$ is read out at a block 208. Based on the read value $(t_n-t_{n-1})$, the angular velocity $\omega_{n,n-1}$ is calculated, at a block 209, according to the following equation:

$$\omega_{n,n-1} = \theta_r/(t_n - t_{n-1})$$

Thereafter, the program execution ends.

Since the fuel injection timing signal St is designed to be produced within the period of time between the time $t_n$ and the time $t_{n+1}$, the interrupt command register 114 produces an interrupt command in response to the timing signal $S_1$ immediately after that produced in response to the reference signal at the time $t_n$. In this case, the program execution goes to the block 202 to reset the counter II 104. Thereafter, the value $t_i-t_n$ is read out from the counter I 103, at a block 211. The read-out value $(t_i-t_n)$ is compared with $\Delta t_1$ and $\Delta t_2$, at a block 212. If the value $(t_i-t_n)$ is equal to or less than $\Delta t_1$, the crank shaft angle $\theta_i$ at the fuel injection timing is calculated according to the foregoing equation (2), $$\theta_i = \frac{(\omega_{n,n-1} - \omega_{n-1,n-2})}{2(t_n - t_{n-1})} \times (t_i - t_n)^2 + \omega_{n,n-1} \times (t_i - t_n)$$

at a block 213. At this time, flag registers FLAG 1 and FLAG 2 are cleared, at a block 226.

On the other hand, if the value $(t_i-t_n)$ is greater than $\Delta t_1$ and equal to or less than $\Delta t_2$, as determined at the block 212, the flag register FLAG 1 is set at a block 214 and program execution ends. Similarly, if the value $(t_i-t_n)$ is greater than $\Delta t_2$, the flag regster FLAG 2 is set at a block 215 and then the program ends.

It should be appreciated that, as set forth previously, since the calculation timing of the fuel injection timing $\theta_i$ is selected in accordance with the value $(t_i-t_n)$, and the formula (3) is to be calculated at the time $t_{n+2}$ and the formula (4) is to be calculated at the time $t_{n+1}$, the program execution ends after the blocks 214 and 215 and merely the FLAGs 1 and 2 are set at the time $t_i$.

In response to the reference signal $S_2$ immediately following the timing signal $S_1$ at time $t_n$, the counter value in the counter II 104 is incremented by 1 at the block 203 and thus equals 1. Therefore, the result of checking at the blocks 204 and 207 will both be NO. After the block 207, the counter value of the counter II 104 is checked to see if it is 1, at a block 210. At this time, since the counter value equal 1, the answer to block 210 is YES.

At a block 216, the value $(t_{n+1}-t_n)$ in the counter I 103 is read out. Thereafter, the angular velocity $(\omega_{n+1,n})$ is calculated at a block 217. Then, the flag register is checked to see if the FLAG 1 is set, at a block 218. If the FLAG 1 was set during the preceding cycle of program execution in response to the timing signal $S_1$, the answer for the block 218 will be YES. In this case, the fuel injection timing $\theta_i$ is calculated at a block 219 according to the foregoing formula (4), $$\theta_i = \frac{(\omega_{n+1,n} - \omega_{n,n-1})}{2(t_{n+1} - t_n)} \times (t_i - t_n)^2 + \omega_{n+1,n} \times (t_i - t_n).$$

In response to the next reference signal $S_2$, the counter value in the counter II 104 is incremented to 2. Therefore, the answer to block 210 becomes NO and thus, the counter value is compared to 2 at a block 220. Since the answer of the block 220 is YES, the counter value $(t_{n+2}-t_{n+1})$ of the counter I 103 is read out at a block 221. Using the read out value $(t_2-t_1)$ the angular velocity $(\omega_{n+2,n+1})$ is calculated at a block 222. Thereafter, the flag register is checked if the FLAG 2 is set at a block 223. If the FLAG 2 has been set, the answer of the block 223 is YES. In this case, the fuel injection timing $\theta_i$ is calculated at a block 224 according to the foregoing formula (3), $$\theta_i = \frac{(\omega_{n+2,n+1} - \omega_{n+1,n})}{2(t_{n+2} - t_{n+1})} \times (t_i - t_n)^2 + \omega_{n+2,n+1} \times (t_i - t_n).$$

The fuel injection timing $\theta_1$ calculated at one of blocks 213, 219 and 224 is ouputted at a block 225 before the program ends.

Figure 7:
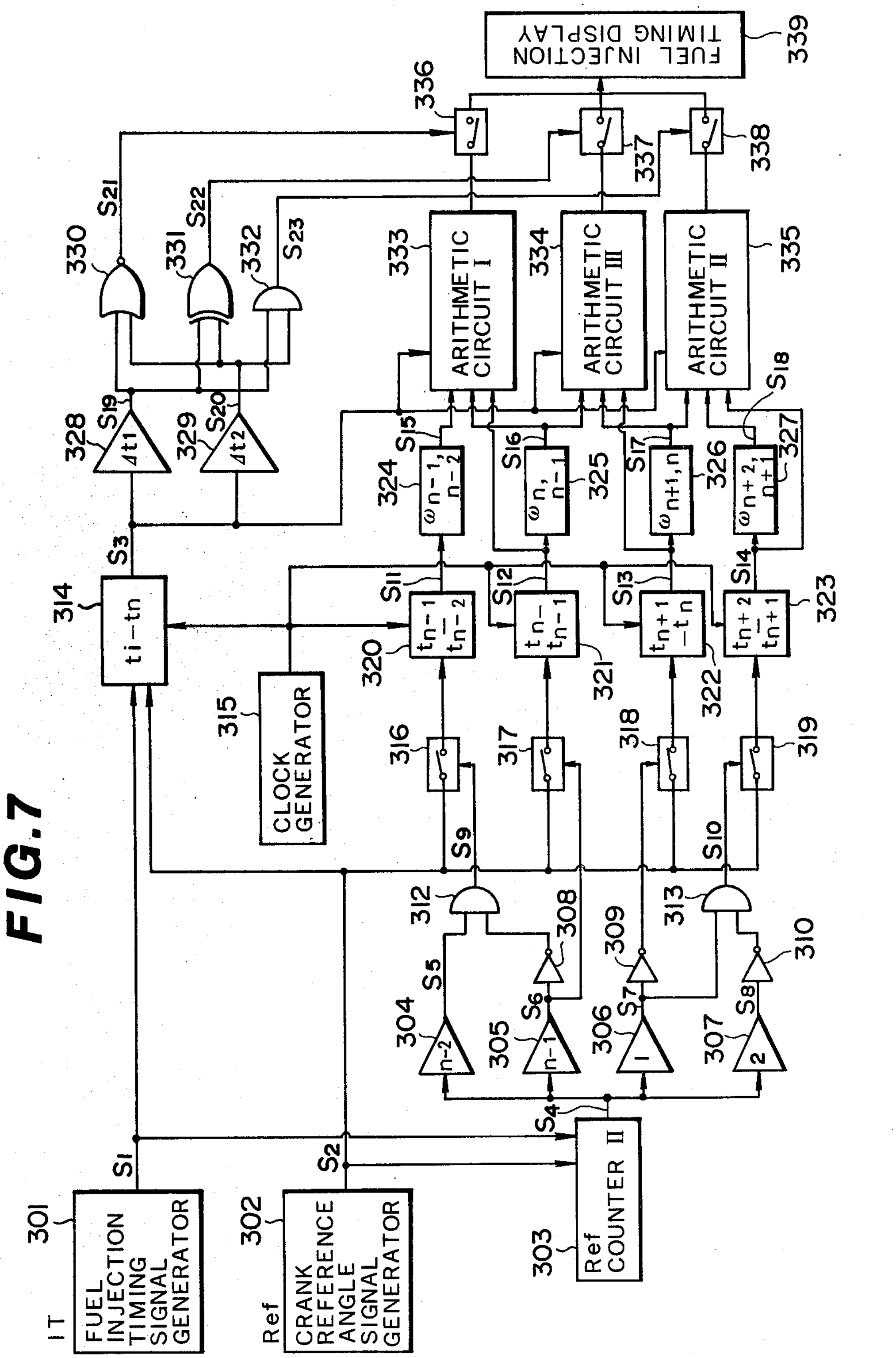
FIG. 7 is a block diagram of an analog circuit for performing the crank angle detecting calculation of FIG. 6, as the second embodiment of the present invention.
Figure 8:
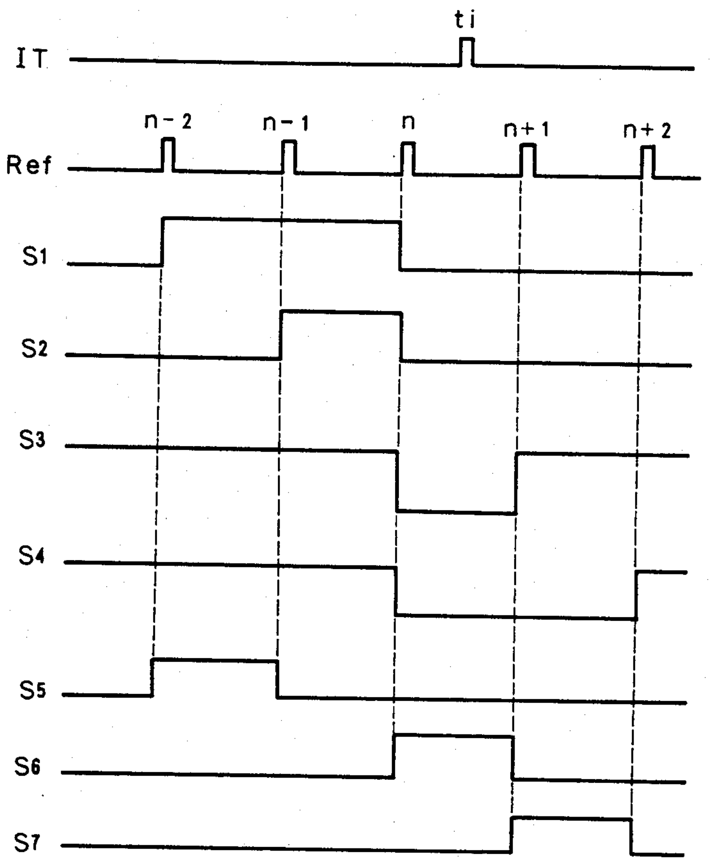
FIG. 8 is a timing chart of important signals in the circuit of FIG. 7.

Referring to FIG. 7, there is illustrated a block diagram of an analog circuit for performing the foregoing fuel injection timing calculation according to the flowchart as set forth with reference to FIG. 6. According to the shown embodiment, the timing signal generator 301 and the reference signal generator 302 are respectively connected to a counter 314 for calculation of a value $(t_i-t_n)$. The timing signal generator 301 and the reference signal generator 302 are also connected to a counter 303. The counter 314 is adapted to count the clock pulses $S_c$ from a clock generator 315 in response to a reference signal $S_2$ and outputs a counter signal $S_3$ indicative of the time interval between the time $t_i$ in which the fuel injection is effected and the time $t_n$ in response to the timing signal $S_1$. The counter 314 is reset by the reference signal $S_2$. On the other hand, the counter 303 counts the pulses of the reference signal $S_2$ to output a counter signal $S_4$ having a value representative of the counter value thereof. The counter 303 is adapted to be reset to zero when the counter value reaches n or in response to the timing signal $S_1$ fed from the timing signal generator 301.

The counter signal $S_4$ of the counter 303 is fed to comparators 304, 305, 306 and 307. The comparator 304 is adapted to compare the counter signal value with a reference value $(n-2)$ to produce a HIGH level comparator signal $S_5$ when the counter value is equal to or greater than the reference value $(n-2)$. The comparator 305 compares the counter value of the counter 303 with a reference value $(n-1)$ and produces a HIGH level comparator signal $S_6$ when the counter value is equal to or greater than the reference value $(n-1)$. The comparator 306 also compares the counter value of the counter 303 with a reference value (1) to produce a HIGH level comparator signal $S_7$ when the counter value reaches or exceeds the reference value (1). Likewise, the comparator 307 compares the counter value with a reference value (2) to produce the HIGH level comparator signal $S_8$ when the counter value is equal to or greater than the reference value (2).

The comparator signals $S_5$ and $S_7$ are respectively fed to input terminals of AND gates 312 and 313. On the other hand, the comparator signals $S_6$ and $S_8$ are fed to the other input terminals of the AND gates 312 and 313 via inverters 308 and 310. Therefore, the AND gate 312 outputs a HIGH level AND signal $S_9$ when the counter value is equal to or greater than the reference value $(n-2)$ and less than the reference value $(n-1)$. This occurs only when the counter value equals $(n-2)$. Likewise, the AND gate 313 produces a HIGH level AND signal $S_{10}$ when the counter value equals (1).

At the same time, the comparator signal $S_6$ of the comparator 305 is fed to a switching circuit 317 to turn the latter ON when the comparator signal $S_6$ is HIGH level. Likewise, the comparator 306 is connected to the switching circuit 318 via an inverter 309 to turn the switching circuit ON when the signal level of the comparator signal $S_7$ is LOW. The AND gates 312 and 313 are respectively connected to switching circuits 316 and 319 to turn the latter ON with the HIGH level signals $S_9$ and $S_{10}$. The switching circuit 316, 317, 318 and 319 are respectively adapted to feed the reference signal $S_2$ to counters 320, 321, 322 and 323 while they are maintained in the ON position. The counters 320, 321, 322 and 323 are all also connected to the clock generator 315. The counter 320 counts the clock pulses $S_c$ to measure the interval between the time $t_{n-2}$ and the time $t_{n-1}$ to produce a counter signal $S_{11}$ having a value representative of ($t_{n-1}-t_{n-2}$). The counter 321 counts the clock pulses $S_c$ to measure the interval between the times $t_n$ and $t_{n-1}$ to produce a counter signal $S_{12}$ having a value representative of ($t_n-t_{n-1}$). The counter 322 counts the clock pulses $S_c$ to measure the interval ($t_1-t_n$) and produce a counter signal $S_{13}$ representative of the measured interval. Finally, the counter 323 produces a counter signal $S_{14}$ representative of the interval ($t_2-t_1$). Respective counter signals $S_{11}$, $S_{12}$, $S_{13}$ and $S_{14}$ are fed to arithmetic circuits 324, 325, 326 and 327 which respectively calculate $\omega_{n-1,n-2}$, $\omega_{n,n-1}$, $\omega_{n+1,n}$, and $\omega_{n+2,1}$ on the basis of the respective counter values in the counters 320, 321, 322 and 323.

The arithmetic circuits 324, 325, 326 and 327 respectively produce angular velocity signals $S_{15}$, $S_{16}$, $S_{17}$ and $S_{18}$ respectively indicative of the calculated angular velocities $\omega_{n-1,n-2}$, $\omega_{n,n-1}$, $\omega_{n+1,n}$, and $\omega_{n+2,n+1}$. The counter signal $S_{12}$ is also fed to an arithmetic circuit 333 to which are also inputted the angular velocity signals $S_{15}$ and $S_{16}$. The angular velocity signal $S_{16}$ is also fed to an arithmetic circuit 334. The arithmetic circuit 334 further receives the counter signal $S_{13}$ and the angular velocity signal $S_{17}$. Likewise, an arithmetic circuit 335 receives the angular velocity signals $S_{17}$ and $S_{18}$ and the counter signal $S_{14}$. Respectively arithmetic circuits 333, 334 and 335 also receive the counter signal $S_3$ of the counter 314. Based on the angular velocity signal values of the signals $S_{15}$ and $S_{16}$ and the counter signal $S_{12}$, the arithmetic circuit 333 calculates the fuel injection timing $\theta_i$ to produce the fuel injection timing indicative signal $S_\theta$ according to the foregoing formula (2), $$\theta_i = \frac{(\omega_{n,n-1} - \omega_{n-1,n-2})}{2(t_n - t_{n-1})} \times (t_i - t_n)^2 + \omega_{n,n-1} \times (t_i - t_n).$$

Likewise, based on the angular velocity signals $S_{16}$ and $S_{17}$ and the counter signals $S_3$ and $S_{13}$, the arithmetic circuit 334 calculates the fuel injection timing $\theta_i$ to produce the fuel injection timing indicative signal $S_\theta$ according to the foregoing formula (3), $$\theta_i = \frac{(\omega_{n+2,n+1} - \omega_{n+1,n})}{2(t_{n+2} - t_{n+1})} \times (t_i - t_n)^2 + \omega_{n+2,n+1} \times (t_i - t_n).$$

Further, based on the angular velocity signals $S_{17}$ and $S_{18}$ and the counter signals $S_3$ and $S_{14}$, the arithmetic circuit 335 calculates the fuel injection timing $\theta_i$ to produce the fuel injection timing indicative signal $S_\theta$ according to the foregoing formula (4), $$\theta_i = \frac{(\omega_{n+1,n} - \omega_{n,n-1})}{2(t_{n+1} - t_n)} \times (t_i - t_n)^2 + \omega_{n+1,n} \times (t_i - t_n).$$

At the same time, the counter signal $S_3$ is fed to comparators 328 and 329. The comparator 328 is adapted to compare the counter signal value with a reference value $\Delta t_1$ and the comparator compares the counter value with a reference value $\Delta t_2$. The comparator 328 produces a HIGH level comparator signal $S_{19}$ when the counter value of the counter 314 exceeds the reference value $\Delta t_1$. Likewise, the comparator 329 produces a HIGH level comparator signal $S_{20}$ when the counter value exceeds the reference value $\Delta t_2$. The comparators 328 and 329 are both connected to each of a NOR gate 330, an EXCLUSIVE-OR gate 331 and an AND gate 332. The output level of the gates 330, 331 and 332 are related to the comparator output level as shown in the following table:

| | $S_{19}$ | $S_{20}$ | $S_{21}$ | $S_{22}$ | $S_{23}$ |
|---|---|---|---|---|---|
| $t_i - t_n \leqq \Delta t_1$ | LOW | LOW | HIGH | LOW | LOW |
| $\Delta t_1 < t_i - t_n \leqq \Delta t_2$ | HIGH | LOW | LOW | HIGH | LOW |
| $\Delta t_2 < t_i - t_n$ | HIGH | HIGH | LOW | LOW | HIGH |

The NOR gate 330 is connected to a switching circuit 336 to turn the latter ON when its output level is HIGH. When turned ON, the switching circuit 336 passes the fuel injection timing indicative signal $S_\theta$ from the arithmetic circuit 333 to a fuel injection timing display 339. The EXCLUSIVE OR gate 331 is connected to a switching circuit 337 to turn the latter ON when the gate signal $S_{22}$ thereof is HIGH level. In this case, the switching circuit 337 passes the fuel injection timing indicative signal $S_\theta$ from the arithmetic circuit 334 to the fuel injection timing display 339. Likewise, the AND gate 332 is connected to a switching circuit 338 which is turned ON by the HIGH level gate signal $S_{23}$. In this ON condition, the switching circuit 338 passes the fuel injection timing indicative signal $S_\theta$ to the fuel injection timing display.

As set forth previously, according to the shown embodiment, the fuel injection timing calculation can be performed in accordance with the interval between the fuel injection timing and the immediately preceding crank angle reference position as in the foregoing first embodiment.

While the invention has been described in detail with respect to calculation of the fuel injection timing, the invention can be applicable for detection for any sort of timing with respect to the crank shaft angular position in relation to the crank reference angle signals. For example, the invention can be applied to timing of spark ignition. Furthermore, the invention can be modified or embodied otherwise in any way for performing the calculation of the crank shaft angular position at a timing in between the crank reference angle signals.

What is claimed is:

1. A crank angle detecting device for an internal combustion engine comprising:

a timing signal generator associated with an engine control system to receive therefrom a timing control signal and responsive to said timing control signal to output a timing signal;

a reference signal generator associated with a crank angle sensor for receiving a crank reference angle signal and responsive to said crank reference angle signal to output a reference signal;

first means for measuring the time intervals between occurrences of said reference signals and the intervals between the occurrences of said timing signal and the immediately preceding reference signal;

second means for calculating the angular acceleration of the crankshaft between occurrences of said reference signals on the basis of said measured period of time; and third means for determining the crank shaft angular position at the occurrence of the timing signal on the basis of said calculated angular acceleration and said measured time interval between the timing signal and the immediately preceding reference signal.

2. The device as set forth in claim 1, which further comprises fourth means associated with said third means for controlling the calculation timing in accordance with the measured interval between the timing signal and the immediately preceding reference signal.

3. The device as set forth in claim 2, which further comprises fourth means for determining an operation timing of said second signal and producing a calculation signal at the determined timing, said fourth means is responsive to said timing signal to compare measured time interval with a predetermined threshold to vary the calculation timing in dependence of the measured time interval.

4. The device as set forth in claim 3, wherein said second means sequentially and cyclically determines said angular acceleration based on the measured time interval and continuously updates a storage with determined angular acceleration for use in determination of said crank shaft angular position as said third means being operative.

5. The device as set forth in claim 1, wherein said first means is associated with a clock generator for producing a clock signal and said first means measures the time interval by counting up of said clock signal.

6. A method for detecting a crank shaft angular position in an internal combustion engine control in which an operational timing of said engine is controlled, composed of the steps:

producing a reference signal in response to a crank reference angle signal which is produced at predetermined crank shaft rotational angular position;

producing a timing signal in response to a timing control signal produced in said engine control for controlling the engine operational timing;

measuring the time intervals between sequentially produced said reference signals and the time interval between sequence of one of said reference signal and said timing signal immediately following to said one of reference signal;

calculating an angular acceleration based on the measured time interval between said reference signals; and determining in calculation a crank shaft angular position based on said angular acceleration and said time interval between said one of reference signal and said timing signal.

7. The method as set forth in claim 6, which further composes the step for comparing the time interval between said one of reference signal and said timing signal with a given threshold to determine a time for carrying out determination of said crank shaft angular position as said timing control signal is produced.

8. The method as set forth in claim 7, wherein said angular acceleration is variable in dependence of the timing of determination of said crank shaft angular position.

9. A crank angle detecting method for an internal combustion engine comprising the steps of:

(a) measuring the time intervals between sequential pulses of a crank reference angle signal, the pulses of which occur after a fixed degree of rotation of a crankshaft of the engine;

(b) calculating the angular acceleration of the crankshaft on the basis of said measured time intervals;

(c) measuring the time interval between each pulse of a timing signal and the immediately preceding pulse of the reference angle signal; and (d) calculating the angular position of the crankshaft at the times of the pulses of the timing signal on the basis of the measured reference angle signal pulse interval and the calculated angular acceleration immediately preceding each pulse of the timing signal; and (e) outputting the calculated angular position as a signal.

* * * * *